(No Model.)  3 Sheets—Sheet 1.

J. J. COURTNEY.
BUNDLE CARRIER.

No. 476,981. Patented June 14, 1892.

Witnesses
E. A. Strunk
R. M. Stratton

Inventor.
John J. Courtney
By his Attorney
D. Strunk (No Model.) 3 Sheets—Sheet 2.
J. J. COURTNEY.
BUNDLE CARRIER.

No. 476,981. Patented June 14, 1892.

Witnesses.
E. A. Strunk
R. M. Stratton

Inventor.
John J. Courtney
By his Attorney.
D. Strunk (No Model.)

3 Sheets—Sheet 3.

J. J. COURTNEY.
BUNDLE CARRIER.

No. 476,981. Patented June 14, 1892.

Witnesses.
E. N. Strunk
R. N. Stratton

Inventor.
John J. Courtney
By his Attorney
D. Strunk

THE NORRIS PETERS CO., PHOTO-LITHO., WASHINGTON, D. C.

UNITED STATES PATENT OFFICE.

JOHN J. COURTNEY, OF MINNEAPOLIS, MINNESOTA.

BUNDLE-CARRIER.

SPECIFICATION forming part of Letters Patent No. 476,981, dated June 14, 1892.

Application filed November 25, 1891. Serial No. 413,100. (No model.)

*To all whom it may concern:*

Be it known that I, JOHN J. COURTNEY, a citizen of the United States, residing at Minneapolis, in the county of Hennepin and State of Minnesota, have invented new and useful Improvements in Bundle-Carriers, of which the following is a specification.

My invention relates to that class of bundle-carriers wherein metallic carrying-arms are used which project stubbleward from the machine to which they are attached in a substantially horizontal direction to receive their load and swing backward and downward toward the side of the machine to discharge the same; and it consists of peculiarly-constructed carrier-arms and peculiarly-constructed supporting-cams within which the carrier-arms are mounted and upon which they work, whereby the said carrier-arms have all the movements necessary to their successful operation in a very simple, cheap, durable, and effective manner; also, to other devices, all of which are fully described in the following specification.

Figure 1:
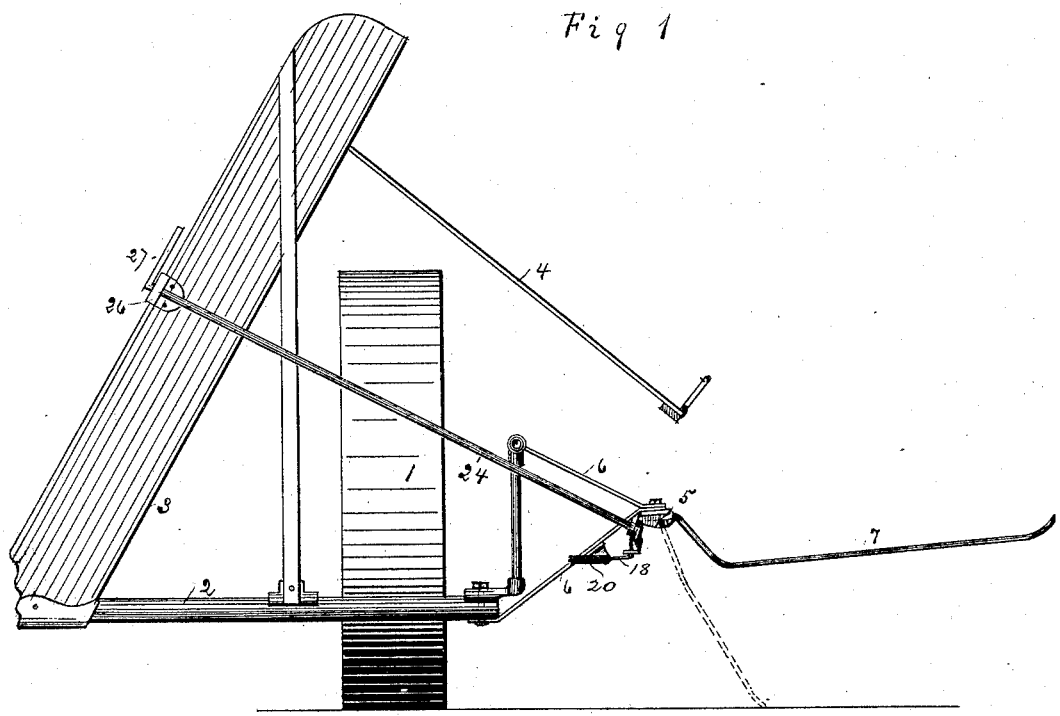
Figure 2:
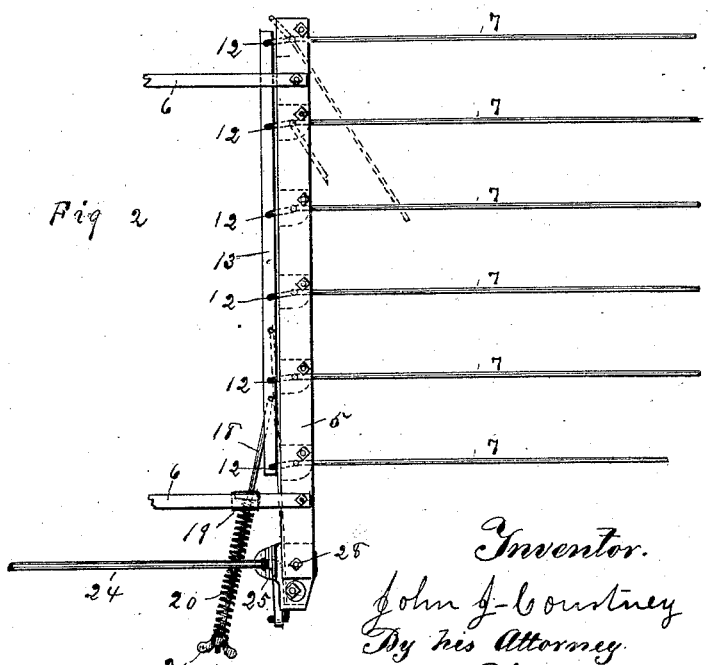
Figure 3:
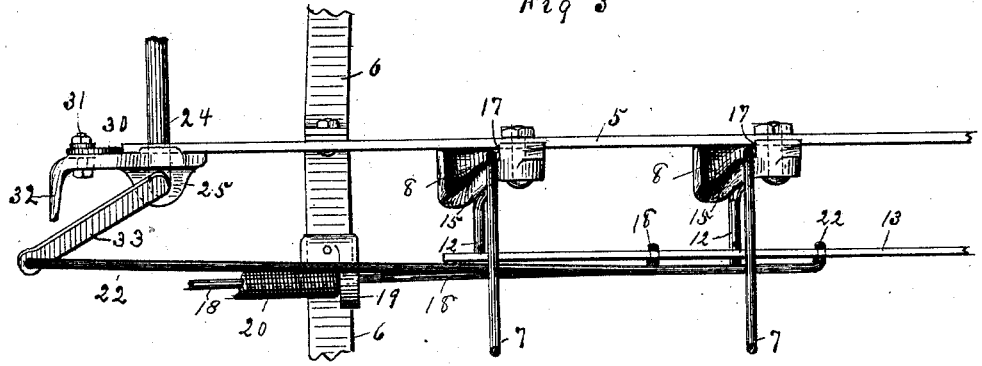
Figure 4:
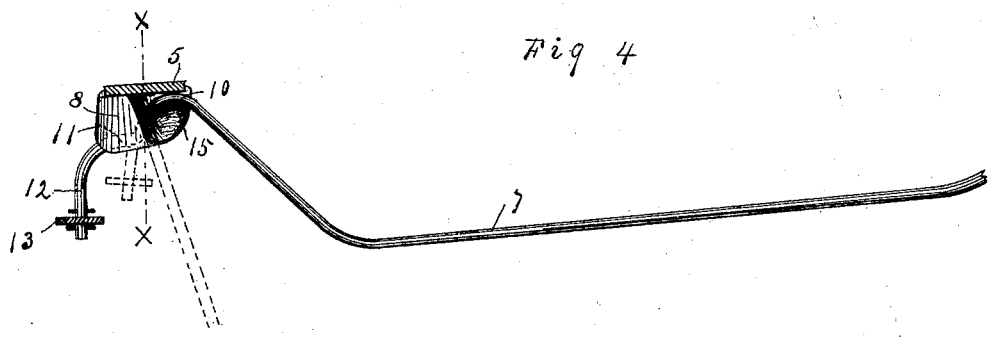
Figure 5:
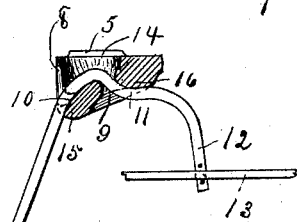
Figure 6:
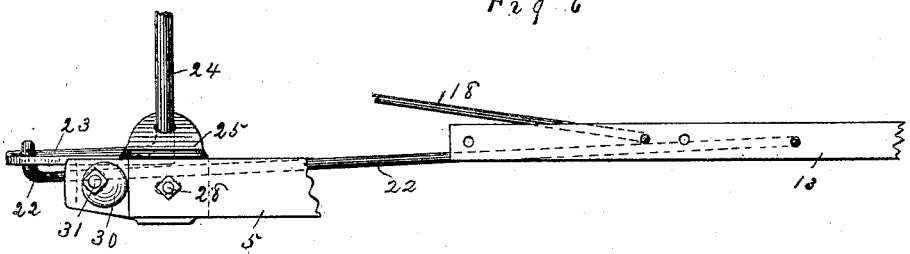
Figure 7:
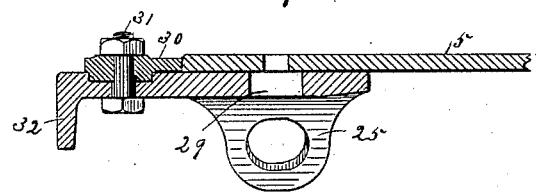

In the drawings, Figure 1 is a rear view of the carrier showing carrier-arms in a working position and a part of a harvester to which it is attached. Fig. 2 is a top view of the carrier on a reduced scale with the carrier-arms in a working position. Fig. 3 is an enlarged view of a portion of the carrier from the stubble side with the carrier-arms in a working position. Fig. 4 is a view from the rear of one arm and one cam detached from the machine with the arm in a working position. Fig. 5 is a view from stubble side, showing a vertical section of the cam on the line *x x*, Fig. 4, and the arm in a position to dump the load. Fig. 6 is a top detail view showing the connections which operate the device. Fig. 7 is a sectional detail showing an adjustably-mounted bearing for the bell-crank which operates the device.

1 is the main wheel of a harvester of any well-known pattern.

2 is the main frame; 3, the elevator, and 4 the deck upon which the bundle is bound.

5 is the frame of the carrier, attached to the harvester by the supports 6.

7 are the carrier-arms, mounted in the supporting-cams 8, which are bolted to the carrier-frame 5, as shown in Fig. 3. The carrier-arms 7, Fig. 5, are formed with the principal carrying portions 7, the pivotal portion 9, the bearing portion 10, stubbleward of the pivotal portion, which bears upon one section of the supporting-cam 8, the bearing portion 11 at the grainward side of the pivotal portion, which bears upon the opposite section of the supporting-cam 8, and the extension or part 12, grainward of the pivotal portion, whereby the several carrier-arms are connected by the bar 13 and operated concurrently.

I prefer to form the carrier-arm 7 with the projection 12 at the grainward side of the supporting-cams 8 by so bending the projection 12 that the connecting part thereof will occupy a substantially vertical position, as shown in Fig. 4, although the projections might obviously be formed in any other effective manner or omitted entirely and the arms 7 connected at the stubbleward side of the supporting-cams without disturbing the principal elements of my invention. I do not therefore wish to be confined to the specific construction of the projection 12 shown and described or the specific construction of the connecting mechanism shown and described, whereby the carrier is controlled by the operator.

The supporting-cams 8 are formed with the opening 14 therethrough, the camway 15, upon the upper surface of which the part 10 of the carrier-arms rides, the camway 16, upon the under surface of which the part 11 of the carrier-arms rides, the shoulder 17, Fig. 3, against which the carrier-arms rest to limit their movement in a forward direction, and means for attaching the cams to the frame 5, as shown. The carrier-arms are inserted loosely through the opening in the supporting-cams 8, Fig. 5, and although free to swing upon their pivotal portion to discharge their load and free to rise up for the passage of obstructions are rigid enough to carry their load by bearing downward upon the camway 15 and upward on the camway 16. An important feature of this construction is that the carrier-arms are so formed as to permit great freedom of movement, are formed with the several parts integral, so that very accurate workmanship is not necessary, and that as a result greater simplicity, durability, and economy of construction is secured.

The projections 12 of the several carrying-arms are connected by the bar 13, which has holes at suitable intervals, through which holes the ends of the projections 12 are inserted, and pins inserted through holes in the projections 12 above and below the bar 13, to retain the latter in its place, as shown.

18 is a rod connected at one end to the bar 13 in a manner similar to the projections 12, or in any other suitable manner, and has the other end passed loosely through a guide 19, attached to the carrier-support 6.

20 is a coiled spring upon the end of the rod 18, which projects through the guide 19, and 21 is a thumb-nut for regulating the tension of the spring.

22 is another rod connected at one end to the bar 13 in a manner similar to the rod 18, and at the other end to the crank 23 upon the rock-shaft 24. The rock-shaft 24 turns in bearings 25 and 26 upon the carrier-frame 5 and harvester-frame 6, respectively. A treadle 27 is formed upon or attached to the end of the rock-shaft 24, near the bearing 26, whereby the operator may hold the carrier-arms in position to receive their load, and return them thereto after the load is discharged.

The bearing 25 is attached to the carrier-frame 5 by the bolt 28, Figs. 2 and 6. An elongated bolt-hole 29, Fig. 7, in the bearing 25 permits the latter to be adjusted toward or from the bar 13 to secure the proper relation between the position of the latter and the crank-shaft 23, through the rod 22, which connects them.

30 is an eccentric-stop fastened to the bearing 25 by the bolt 31, as shown in Figs. 6 and 7, and adjusted by turning upon the bolt 31 as an axis to rest against the end of the frame 5 to prevent accidental movements of the bearing 25 toward the bar 13 by the stress upon the rod 22.

32 is a stop formed integral or otherwise attached to the bearing 25 to limit the movement of the bell-crank 23 in that direction.

The bar 13 is connected to the projections 12 of the carrier-arms and to one end of the rods 18 and 22, and the other end of the said rods to the guide 19 and bell-crank 23 with sufficient looseness to permit the several parts to assume the position required when the carrier is operated to discharge its load or when the carrier-arms are raised to pass an obstruction.

The operation of the carrier is as follows: In its working position the carrier-arms are maintained in the position shown in Figs. 1, 2, and 4 by the operator pressing his foot upon the treadle 27 until a sufficient load has accumulated. To discharge the load, the treadle is released, when the part 10 of the arms 7 slides down the inclined camway 15 until the arms and the parts occupy the position shown in dotted lines in Figs. 1, 2, and 4.

The bundles slide down to the ground and the forward movement of harvester withdraws the arms from under them. The movement of the carrier-arms to discharge their load compresses the coiled spring 20, the expansion of which assists the operator in returning the arms to their working position, which is effected by again pressing the treadle 27.

Having thus described my invention, what I claim as new, and desire to secure by Letters Patent, is—

1. The combination, in a bundle-carrier for grain-harvesting machines, of carrier-arms integrally formed with a pivotal portion 9, whereby they are loosely mounted in their supports, a guiding portion 10 at the stubbleward side of the pivotal portion, a guiding portion 11 at the grainward side of the pivotal portion, connecting mechanism whereby the several arms are caused to move concurrently and are controlled by the operator, and supporting-cam 8, provided with the opening 14, the camway 15, and the camway 16, whereby the arms are supported rigidly to carry their load and caused to move downward and backward toward the side of the machine to discharge the same, substantially as described.

2. The combination, in a bundle-carrier for grain-harvesting machines, of carrier-arms integrally formed with its sole pivotal portion 9, whereby the arms are loosely mounted in their supports, and projections 12 at the grainward end of the carrier-arms, the bar 13, connecting the projections 12 of the several arms together, connecting mechanism whereby the carrier is controlled by the operator, and guiding-cams in which the arms are loosely mounted, supported rigidly to carry their load and caused to move downward and backward toward the side of the machine to discharge the same, substantially as described.

3. The combination, in a bundle-carrier for grain-harvesting machines, of carrier-arms integrally formed with a pivotal portion 9, whereby they are loosely mounted in their supports, a guiding portion 10 at the stubbleward side of the pivotal portion, a guiding portion 11 at the grainward side of the pivotal portion, and projection 12 at the grainward end of the carrier-arms, the bar 13, connecting the projection 12 of the several arms together, controlling mechanism whereby the carrier is controlled by the operator, and supporting-cams 8, provided with the opening 14, camway 15, and camway 16, whereby the carrier-arms are supported rigidly to carry their load and caused to move downward and backward toward the side of the machine to discharge the same, substantially as described.

4. In a bundle-carrier for grain-harvesting machines, the combination of the carrier-arm 7, the pivotal portion 9, the bearing portion 10, the bearing portion 11, the projection 12, the bar 13, the guiding-cam 8, with the opening 14, camway 15, and camway 16, the rod 18, guide 19, and spring 20, substantially as described.

5. In a bundle-carrier for grain-harvesting machines, the combination of the carrier-arms 7, the pivotal portion 9 thereof, the bearing portion 10 thereof, the bearing portion 11 thereof, and the projection 12 thereof, with the bar 13, the guiding-cam 8, provided with the opening 14, camway 15, and camway 16, the rod 18, guide 19, and spring 20, the rod 22, bell-crank 23, rock-shaft 24, and adjustable bearing 25, substantially as described.

6. In a bundle-carrier for grain-harvesting machines, the combination of the carrier-arms 7, the pivotal portion 9 thereof, the bearing portion 10 thereof, the bearing portion 11 thereof, and the projection 12 thereof, with the bar 13, the guiding-cam 8, provided with the opening 14, camway 15, and camway 16, the rod 18, guide 19, and spring 20, the rod 22, bell-crank 23, rock-shaft 24, adjustable stop 30, and stop 32, substantially as described.

JOHN J. COURTNEY.

Witnesses:
C. F. FASSETT,
SAMUEL THURSTON.